US010942244B2

(12) United States Patent
Droz

(10) Patent No.: US 10,942,244 B2
(45) Date of Patent: Mar. 9, 2021

(54) SYSTEMS AND METHODS FOR LIDARS WITH ADJUSTABLE RESOLUTION AND FAILSAFE OPERATION

(71) Applicant: Waymo LLC, Mountain View, CA (US)

(72) Inventor: Pierre-Yves Droz, Los Altos, CA (US)

(73) Assignee: Waymo LLC, Mountain View, CA (US)

(*) Notice: Subject to any disclaimer, the term of this patent is extended or adjusted under 35 U.S.C. 154(b) by 471 days.

(21) Appl. No.: 15/839,677

(22) Filed: Dec. 12, 2017

(65) Prior Publication Data

US 2019/0178974 A1 Jun. 13, 2019

(51) Int. Cl.
G01S 3/782 (2006.01)
G01S 17/42 (2006.01)
G01S 17/89 (2020.01)
G01S 7/481 (2006.01)
G06K 9/46 (2006.01)
G01S 17/86 (2020.01)

(52) U.S. Cl.
CPC ............ *G01S 3/782* (2013.01); *G01S 7/4814* (2013.01); *G01S 7/4815* (2013.01); *G01S 17/42* (2013.01); *G01S 17/89* (2013.01); *G01S 7/4817* (2013.01); *G01S 17/86* (2020.01); *G06K 9/4628* (2013.01)

(58) Field of Classification Search
None
See application file for complete search history.

(56) References Cited

U.S. PATENT DOCUMENTS

| 9,041,915 | B2 | 5/2015 | Earhart et al. |
| 2005/0057741 | A1* | 3/2005 | Anderson ............... G01S 17/42 356/5.01 |
| 2013/0054187 | A1 | 2/2013 | Pochiraju et al. |
| 2013/0103298 | A1 | 4/2013 | Becker et al. |
| 2013/0127854 | A1* | 5/2013 | Shpunt ............... G01B 11/2518 345/420 |

(Continued)

FOREIGN PATENT DOCUMENTS

| WO | 2016/134321 A1 | 8/2016 |
| WO | 2016/153687 | 9/2016 |

OTHER PUBLICATIONS

International Searching Authority, International Search Report and Written Opinion dated Feb. 27, 2019, issued in connection with International Patent Application No. PCT/US2018/058359, filed on Oct. 31, 2018, 13 pages.

*Primary Examiner* — Luke D Ratcliffe
*Assistant Examiner* — Amir J Askarian
(74) *Attorney, Agent, or Firm* — McDonnell Boehnen Hulbert & Berghoff LLP

(57) ABSTRACT

The present disclosure relates to systems and methods operable to provide point cloud information about an environment based on reconfigurable spatial light emission patterns and reconfigurable light detector arrangements that correspond to the light emission patterns. Additionally, a LIDAR device with a plurality of light emitters and photodetectors may be operated in a first mode of operation or a second mode of operation. The first mode of operation could be a normal mode of operation. The second mode of operation could be a failsafe mode of operation that is used when a fault condition is detected.

10 Claims, 8 Drawing Sheets

Forward View

(56) References Cited

U.S. PATENT DOCUMENTS

| | | | |
|---|---|---|---|
| 2013/0207970 A1* | 8/2013 | Shpunt | H01S 5/4012 |
| | | | 345/419 |
| 2015/0042977 A1* | 2/2015 | Siercks | G01C 15/002 |
| | | | 356/4.01 |
| 2015/0185327 A1* | 7/2015 | Boeckem | G01C 1/02 |
| | | | 356/4.01 |
| 2015/0301178 A1 | 10/2015 | Brinkmeyer et al. | |
| 2016/0282468 A1* | 9/2016 | Gruver | G01C 3/02 |
| 2016/0313435 A1 | 10/2016 | Smitherman | |
| 2017/0024877 A1 | 1/2017 | Versace et al. | |
| 2017/0131388 A1 | 5/2017 | Campbell et al. | |
| 2017/0307736 A1 | 10/2017 | Donovan | |
| 2017/0328990 A1* | 11/2017 | Magee | G01S 7/4817 |
| 2018/0365908 A1* | 12/2018 | Liu | G05D 1/005 |
| 2019/0324124 A1* | 10/2019 | O'Keeffe | G01S 17/89 |

* cited by examiner

Forward View

Forward View

SYSTEMS AND METHODS FOR LIDARS WITH ADJUSTABLE RESOLUTION AND FAILSAFE OPERATION

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR system may emit near-infrared light pulses, which may interact with objects in the system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object.

In some cases, LIDAR systems may be used in association with fully-autonomous or semi-autonomous vehicles, such as self-driving cars and trucks.

SUMMARY

The present disclosure relates to systems and methods that provide point cloud information about an environment based on reconfigurable spatial light emission patterns and reconfigurable light detector arrangements that correspond to the light emission patterns. Additionally, a LIDAR device with a plurality of light emitters and photodetectors may be operated in a first mode of operation or a second mode of operation. The first mode of operation could be a normal mode of operation. The second mode of operation could be a failsafe mode of operation that is used when a fault condition is detected.

In a first aspect, a system is provided. The system includes a first set of light-emitter devices that emit pulses according to a first spatial light pattern. The system also includes a second set of light emitter devices that emit light pulses according to a second light spatial pattern. The first spatial light pattern and the second spatial light pattern include different spatial resolutions. The system further includes a first set of light-detecting devices configured to detect at least a portion of the light pulses emitted according to the first spatial light pattern so as to provide first reflected light data. The system additionally includes a second set of light-detecting devices configured to detect at least a portion of the light pulses emitted according to the second spatial light pattern so as to provide second reflected light data. The system also includes a controller operable to form point cloud data based on the first reflected light data and the second reflected light data.

In a second aspect, a method is provided. The method includes causing, during a first time period, a first set of light-emitter devices of a plurality of light-emitter devices to emit light pulses into an environment according to a first spatial light pattern. The method also includes obtaining, with a first set of light-detecting devices, first reflected light data by detecting at least a portion of the light pulses emitted into the environment according to the first spatial light pattern. The method additionally includes causing, during a second time period, a second set of light-emitter devices of the plurality of light-emitter devices to emit light pulses into the environment according to a second spatial light pattern. The first spatial light pattern and the second spatial light pattern include different spatial resolutions. The method yet further includes obtaining, with a second set of light-detecting devices, second reflected light data by detecting at least a portion of the light pulses emitted into the environment according to the second spatial light pattern. The method also includes forming point cloud data based on the first reflected light data and the second reflected light data.

In a third aspect, a system is provided. The system includes a housing configured to rotate about a rotational axis and a transmit assembly. The transmit assembly includes a first set of light-emitter devices and a second set of light-emitter devices. The light-emitter devices are operable to emit light pulses. A portion of the light pulses interact with an environment of the system to provide reflected light pulses. The system also includes a receive assembly that includes a first set of light-detecting devices and a second set of light-detecting devices. The light-detecting devices are operable to detect the reflected light pulses. The transmit assembly and the receive assembly are coupled to the housing. The system additionally includes a first power supply configured to provide power to at least the first set of light-emitter devices and the first set of light-detecting devices. The system yet further includes a second power supply configured to provide power to at least the second set of light-emitter devices and the second set of light-detecting devices. The system also includes a controller having at least one processor and a memory. The at least one processor executes program instructions stored in the memory so as to carry out operations. The operations include operating the system according to a first mode of operation. The first mode of operation includes causing the first set of light-emitter devices and the second set of light-emitter devices to emit light pulses into the environment and causing the first set of light-detecting devices and the second set of light-detecting devices to obtain respective first and second reflected light data, by detecting at least a portion of the light pulses emitted into the environment. The operations also include forming point cloud data based on the first reflected light data and the second reflected light data. The operations additionally include determining a fault condition based on receiving information indicative of a malfunction of at least one of: the first set of light-emitter devices, the second set of light-emitter devices, the first set of light-detecting devices, the second set of light-detecting devices, the first power supply, or the second power supply. The operations also include, in response to determining the fault condition, operating the system in a second mode of operation. The second mode of operation includes causing either the first set of light-emitter devices or the second set of light-emitter devices to emit light pulses into the environment. The second mode of operation also includes causing a corresponding set of light-detecting devices to obtain coarse reflected light data, by detecting at least a portion of the light pulses emitted into the environment. The second mode of operation also includes forming coarse point cloud data based on the coarse reflected light data.

In a fourth aspect, a method is provided. The method includes operating a LIDAR system according to a first mode of operation. The first mode of operation includes causing a first set of light-emitter devices and a second set of light-emitter devices to emit light pulses into an environment and causing a first set of light-detecting devices and a second set of light-detecting devices to obtain respective first and second reflected light data, by detecting at least a portion of the light pulses emitted into the environment. The first mode of operation also includes forming point cloud data based on the first reflected light data and the second reflected light data. The first mode of operation additionally includes determining a fault condition based on receiving information indicative of a malfunction of at least one of: the first set of light-emitter devices, the second set of light-emitter devices, the first set of light-detecting devices, the second set of light-detecting devices, a first power supply, or a second power supply. The first power supply provides power to at least the first set of light-emitter devices and the first set of light-detecting devices. The second power supply provides power to at least the second set of light-emitter devices and the second set of light-detecting devices. The operations also include, in response to determining the fault condition, operating the system in a second mode of operation. The second mode of operation includes causing either the first set of light-emitter devices or the second set of light-emitter devices to emit light pulses into the environment. The second mode of operation includes causing a corresponding set of light-detecting devices to obtain coarse reflected light data, by detecting at least a portion of the light pulses emitted into the environment. The second mode of operation additionally includes forming coarse point cloud data based on the coarse reflected light data.

Other aspects, embodiments, and implementations will become apparent to those of ordinary skill in the art by reading the following detailed description, with reference where appropriate to the accompanying drawings.

DETAILED DESCRIPTION

Figure 1A:
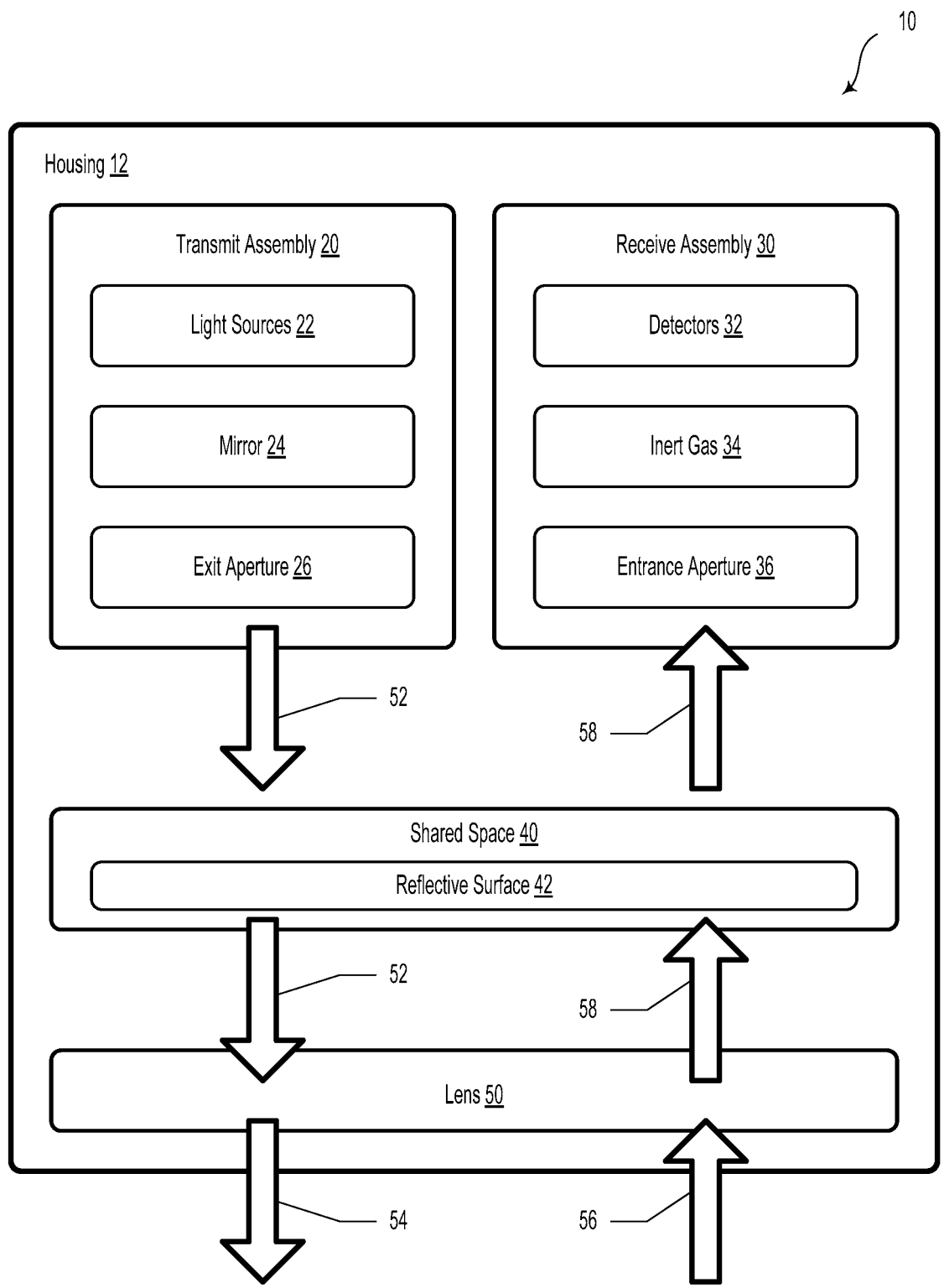
FIG. 1A illustrates a sensing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A Light Detection and Ranging (LIDAR) system may include a plurality of light emitter and detectors (e.g., 256 or more emitter/detector pairs). The arrangement of the plurality of light emitters and detectors and a pose of the LIDAR system itself (e.g., a rotational angle of the LIDAR system) may provide information about objects in the environment. In some embodiments, the LIDAR system may provide information to a semi- or fully-autonomous vehicle, such as a self-driving car, robot, or self-flying aerial vehicle.

In some embodiments, the LIDAR system may be configured to rotate about a rotational axis. In such scenarios, each emitter/detector pair may be oriented at a given angle and azimuth with respect to the LIDAR system. As an example, the emitter/detector pairs may be arranged at various elevation angles with respect to the rotational axis. For instance, the emitter/detector pairs may be arranged so as to provide a vertical fan-like distribution of laser light that rotates about the rotational axis of the LIDAR system so as to obtain point cloud information about objects within the environment around the LIDAR system.

In some embodiments, the LIDAR system may be configured to operate with a dynamically adjustable spatial resolution. For example, the LIDAR system could operate in a high-resolution mode in which all of the emitter/detector pairs are active. That is, each light-emitter may emit a light pulse into the environment and a corresponding detector may "listen" for a reflected light pulse, which may indicate the possibility of an object in the environment. The LIDAR system could also be configured to operate in a reduced-resolution mode in which a subset of the emitter/detector pairs may be active. In other words, not all of the emitter/detector pairs would be used in the reduced-resolution mode.

In an example embodiment, high-resolution scans of the environment may be interleaved with reduced-resolution scans. For example, a high-resolution scan may be conducted over a region of interest in the environment (e.g., another vehicle, a person, a sign, a stoplight, another type of object of interest, etc.) while reduced-resolution scans may be conducted over other portions of the environment. Additionally or alternatively, 360-degree scans may be conducted in high-resolution or reduced-resolution on an alternating, periodic, or as-needed basis. For example, a high-resolution scan could be conducted once every ten revolutions of the LIDAR system (e.g., once a second at a 10 Hz rotational rate), while reduced-resolution scans could be conducted during the other nine revolutions. It will be understood that other combinations of high- and reduced-resolution scans are possible and contemplated herein.

In an embodiment, the high-resolution mode may include a spatial point cloud resolution of about 200 millimeters at 25 meters from the LIDAR system while the reduced-resolution mode may include a spatial point cloud resolution of about 400 millimeters at 25 meters from the LIDAR system. It will be understood that a wide range of spatial point cloud resolutions are possible within the scope of the present disclosure. For instance, in some embodiments, a resolution of the LIDAR system may be dynamically adjustable from about 25 millimeters to about 600 millimeters at a distance of 25 meters from the LIDAR system.

Additionally or alternatively, a receive assembly of the LIDAR system may include two sets each of detectors, control electronics, power supplies, and optics. That is, the receive assembly may include a first set of receive channels and a second set of receive channels, which may be operated independent from one another. For example, a first plurality of detectors (e.g., SiPMs) may be termed "Odd" detectors and a second plurality of detectors may be termed "Even" detectors. In some embodiments, the two sets of receive channels, and their accompanying electronics may be split between two substrates.

As such, the receive assembly of the LIDAR may provide improved redundancy and resistance to single point failures. In other words, even if one set of receive channels fails, malfunctions, or is otherwise inoperable, an automotive LIDAR may still be able to provide safe operation. For example, navigation may still be possible using the operable half of the detectors, which may provide half the normal resolution. Other reduced resolutions are possible and contemplated. In such a scenario, a controller of the self-driving vehicle may operate in a failsafe mode. For example, the controller may cause the vehicle to pull over in a controlled fashion, drive to the nearest service station for repair, or take other relevant action.

II. Example Systems

FIG. 1A illustrates a sensing system 10, according to an example embodiment. The sensing system 10 may be a light detection and ranging (LIDAR) system. Such a LIDAR system may be configured to provide information (e.g., point cloud data) about one or more objects (e.g., location, shape, etc.) in a given environment. In an example embodiment, the LIDAR system could provide point cloud information, object information, mapping information, or other information to a vehicle. The vehicle could be a semi- or fully-automated vehicle. For instance, the vehicle could be a self-driving car, an autonomous drone aircraft, an autonomous truck, or an autonomous robot. Other types of vehicles and LIDAR systems are contemplated herein.

The sensing system 10 includes a housing 12 that houses an arrangement of various components, such as a transmit assembly 20, a receive assembly 30, a shared space 40, and a lens 50. The sensing system 10 includes an arrangement of components configured to provide emitted light beams 52 from the transmit assembly 20 that are collimated by the lens 50 and transmitted into an environment of the sensing system 10 as collimated light beams 54. Furthermore, the sensing system 10 includes an arrangement of components configured to collect reflected light 56 from one or more objects in the environment of the sensing system 10 by the lens 50 for focusing towards the receive assembly 30 as focused light 58. The reflected light 56 includes light from the collimated light beams 54 that was reflected by the one or more objects in the environment of the sensing system 10.

The emitted light beams 52 and focused light 58 may traverse the shared space 40 also included in the housing 12. In some embodiments, the emitted light beams 52 propagate along a transmit path through the shared space 40 and the focused light 58 propagates along a receive path through the shared space 40. In some implementations, a portion of the transmit path may overlap a portion of the receive path.

The sensing system 10 can determine an aspect of the one or more objects (e.g., a location of the object(s), a shape of the object(s), a material of the object(s), etc.) in the environment of the sensing system 10 by processing the focused light 58 received by the receive assembly 30. For example, the sensing system 10 can compare a time when pulses included in the emitted light beams 52 were emitted by the transmit assembly 20 with a time when corresponding pulses included in the focused light 58 were received by the receive assembly 30 and determine the distance between the one or more objects and the sensing system 10 based on the comparison.

The housing 12 included in the sensing system 10 can provide a platform for mounting the various components included in the sensing system 10. The housing 12 can be formed from any material capable of supporting the various components of the sensing system 10 included in an interior space of the housing 12. For example, the housing 12 may be formed from a structural material such as plastic or metal.

In some examples, the housing 12 may include optical shielding configured to reduce ambient light and/or unintentional transmission of the emitted light beams 52 from the transmit assembly 20 to the receive assembly 30. The optical shielding can be provided by forming and/or coating the outer surface of the housing 12 with a material that blocks the ambient light from the environment. Additionally, inner surfaces of the housing 12 can include and/or be coated with the material described above to optically isolate the transmit assembly 20 from the receive assembly 30 to prevent the receive assembly 30 from receiving the emitted light beams 52 before the emitted light beams 52 reach the lens 50.

In some examples, the housing 12 can be configured for electromagnetic shielding to reduce electromagnetic noise (e.g., Radio Frequency (RF) Noise, etc.) from ambient environment of the sensing system 10 and/or electromagnetic noise between the transmit assembly 20 and the receive assembly 30. Electromagnetic shielding can improve quality of the emitted light beams 52 emitted by the transmit assembly 20 and reduce noise in signals received and/or provided by the receive assembly 30. Electromagnetic shielding can be achieved by forming and/or coating the housing 12 with one or more materials such as a metal, metallic ink, metallic foam, carbon foam, or any other material configured to appropriately absorb or reflect electromagnetic radiation. Metals that can be used for the electromagnetic shielding can include for example, copper or nickel.

In some examples, the housing 12 can be configured to have a substantially cylindrical shape and to rotate about an axis of the sensing system 10. For example, the housing 12 can have the substantially cylindrical shape with a diameter of approximately 10 centimeters. In some examples, the axis is substantially vertical. By rotating the housing 12 that includes the various components, in some examples, a three-dimensional map of a 360 degree view of the environment of the sensing system 10 can be determined without frequent recalibration of the arrangement of the various components of the sensing system 10. Additionally or alternatively, the sensing system 10 can be configured to tilt the axis of rotation of the housing 12 to control the field of view of the sensing system 10.

Although not illustrated in FIG. 1A, the sensing system 10 can optionally include a mounting structure for the housing 12. The mounting structure can include a motor or other means for rotating the housing 12 about the axis of the sensing system 10. Alternatively, the mounting structure can be included in a device and/or system other than the sensing system 10.

In some examples, the various components of the sensing system 10 such as the transmit assembly 20, receive assembly 30, and the lens 50 can be removably mounted to the housing 12 in predetermined positions to facilitate calibrating the arrangement of each component and/or subcomponents included in each component. Thus, the housing 12 acts as the platform for the various components of the sensing system 10 to provide ease of assembly, maintenance, calibration, and manufacture of the sensing system 10.

The transmit assembly 20 includes a plurality of light sources 22 that can be configured to emit the plurality of emitted light beams 52 via an exit aperture 26. In some examples, each of the plurality of emitted light beams 52 corresponds to one of the plurality of light sources 22. The transmit assembly 20 can optionally include a mirror 24 along the transmit path of the emitted light beams 52 between the light sources 22 and the exit aperture 26.

The light sources 22 can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 52. In some examples, the light sources 22 can be configured to emit the emitted light beams 52 in a wavelength range that can be detected by detectors 32 included in the receive assembly 30. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 22 can be configured to emit the emitted light beams 52 in the form of pulses. In some examples, the plurality of light sources 22 can be disposed on one or more substrates (e.g., printed circuit boards (PCB), flexible PCBs, etc.) and arranged to emit the plurality of light beams 52 towards the exit aperture 26.

In some examples, the plurality of light sources 22 can be configured to emit uncollimated light beams included in the emitted light beams 52. For example, the emitted light beams 52 can diverge in one or more directions along the transmit path due to the uncollimated light beams emitted by the plurality of light sources 22. In some examples, vertical and horizontal extents of the emitted light beams 52 at any position along the transmit path can be based on an extent of the divergence of the uncollimated light beams emitted by the plurality of light sources 22.

The exit aperture 26 arranged along the transmit path of the emitted light beams 52 can be configured to accommodate the vertical and horizontal extents of the plurality of light beams 52 emitted by the plurality of light sources 22 at the exit aperture 26. It is noted that the block diagram shown in FIG. 1A is described in connection with functional modules for convenience in description. However, the functional modules in the block diagram of FIG. 1A can be physically implemented in other locations. For example, although FIG. 1A shows that the exit aperture 26 is included in the transmit assembly 20, the exit aperture 26 can be physically included in both the transmit assembly 20 and the shared space 40. For example, the transmit assembly 20 and the shared space 40 can be separated by a wall that includes the exit aperture 26. In this case, the exit aperture 26 can correspond to a transparent portion of the wall. In one example, the transparent portion can be a hole or cut-away portion of the wall. In another example, the wall can be formed from a transparent substrate (e.g., glass) coated with a non-transparent material, and the exit aperture 26 can be a portion of the substrate that is not coated with the non-transparent material.

In some examples of the sensing system 10, it may be desirable to minimize a vertical and/or horizontal size of the exit aperture 26 while accommodating the vertical and horizontal extents of the plurality of light beams 52. For example, minimizing the size of the exit aperture 26 can improve the optical shielding of the light sources 22 described above in the functions of the housing 12. Additionally or alternatively, the wall separating the transmit assembly 20 and the shared space 40 can be arranged along the receive path of the focused light 58, and thus, the exit aperture 26 can be minimized to allow a larger portion of the focused light 58 to reach the wall. For example, the wall can be coated with a reflective material (e.g., reflective surface 42 in shared space 40) and the receive path can include reflecting the focused light 58 by the reflective material towards the receive assembly 30. In this case, minimizing the size of the exit aperture 26 can allow a larger portion of the focused light 58 to reflect off the reflective material with which the wall is coated.

To minimize the size of the exit aperture 26, in some examples, the divergence of the emitted light beams 52 can be reduced by partially collimating the uncollimated light beams emitted by the light sources 22 to minimize the vertical and horizontal extents of the emitted light beams 52 and thus minimize the size of the exit aperture 26. For example, each light source of the plurality of light sources 22 can include a cylindrical lens arranged adjacent to the light source. The light source may emit a corresponding uncollimated light beam that diverges more in a first direction than in a second direction. The cylindrical lens may pre-collimate the uncollimated light beam in the first direction to provide a partially collimated light beam, thereby reducing the divergence in the first direction. In some examples, the partially collimated light beam diverges less in the first direction than in the second direction. Similarly, uncollimated light beams from other light sources of the plurality of light sources 22 can have a reduced beam width in the first direction and thus the emitted light beams 52 can have a smaller divergence due to the partially collimated light beams. In this example, at least one of the vertical and horizontal extents of the exit aperture 26 can be reduced due to partially collimating the light beams 52.

Additionally or alternatively, to minimize the size of the exit aperture 26, in some examples, the light sources 22 can be arranged along a shaped surface defined by the transmit assembly 20. In some examples, the shaped surface may be faceted and/or substantially curved. The faceted and/or curved surface can be configured such that the emitted light beams 52 converge towards the exit aperture 26, and thus the vertical and horizontal extents of the emitted light beams 52 at the exit aperture 26 can be reduced due to the arrangement of the light sources 22 along the faceted and/or curved surface of the transmit assembly 20.

In some examples, a curved surface of the transmit assembly 20 can include a curvature along the first direction of divergence of the emitted light beams 52 and a curvature along the second direction of divergence of the emitted light beams 52, such that the plurality of light beams 52 converge towards a central area in front of the plurality of light sources 22 along the transmit path.

To facilitate such curved arrangement of the light sources 22, in some examples, the light sources 22 can be disposed on a flexible substrate (e.g., flexible PCB) having a curvature along one or more directions. For example, the curved flexible substrate can be curved along the first direction of divergence of the emitted light beams 52 and the second direction of divergence of the emitted light beams 52. Additionally or alternatively, to facilitate such curved arrangement of the light sources 22, in some examples, the light sources 22 can be disposed on a curved edge of one or more vertically-oriented printed circuit boards (PCBs), such that the curved edge of the PCB substantially matches the curvature of the first direction (e.g., the vertical plane of the PCB). In this example, the one or more PCBs can be mounted in the transmit assembly 20 along a horizontal curvature that substantially matches the curvature of the second direction (e.g., the horizontal plane of the one or more PCBs). For example, the transmit assembly 20 can include four PCBs, with each PCB mounting sixteen light sources, so as to provide 64 light sources along the curved surface of the transmit assembly 20. In this example, the 64 light sources are arranged in a pattern such that the emitted light beams 52 converge towards the exit aperture 26 of the transmit assembly 20.

The transmit assembly 20 can optionally include the mirror 24 along the transmit path of the emitted light beams 52 between the light sources 22 and the exit aperture 26. By including the mirror 24 in the transmit assembly 20, the transmit path of the emitted light beams 52 can be folded to provide a smaller size of the transmit assembly 20 and the housing 12 of the sensing system 10 than a size of another transmit assembly where the transmit path that is not folded.

The receive assembly 30 includes a plurality of detectors 32 that can be configured to receive the focused light 58 via an entrance aperture 36. In some examples, each of the plurality of detectors 32 is configured and arranged to receive a portion of the focused light 58 corresponding to a light beam emitted by a corresponding light source of the plurality of light sources 22 and reflected of the one or more objects in the environment of the sensing system 10. The receive assembly 30 can optionally include the detectors 32 in a sealed environment having an inert gas 34.

The detectors 32 may comprise photodiodes, avalanche photodiodes, phototransistors, cameras, active pixel sensors (APS), charge coupled devices (CCD), cryogenic detectors, or any other sensor of light configured to receive focused light 58 having wavelengths in the wavelength range of the emitted light beams 52.

To facilitate receiving, by each of the detectors 32, the portion of the focused light 58 from the corresponding light source of the plurality of light sources 22, the detectors 32 can be disposed on one or more substrates and arranged accordingly. For example, the light sources 22 can be arranged along a curved surface of the transmit assembly 20. Detectors 32 can be arranged along a curved surface of the receive assembly 30. In some embodiments, the curved surface of the receive assembly 30 may include a similar or identical curved surface as that of transmit assembly 20. Thus, each of the detectors 32 may be configured to receive light that was originally emitted by a corresponding light source of the plurality of light sources 22.

To provide the curved surface of the receive assembly 30, the detectors 32 can be disposed on the one or more substrates similarly to the light sources 22 disposed in the transmit assembly 20. For example, the detectors 32 can be disposed on a flexible substrate (e.g., flexible PCB) and arranged along the curved surface of the flexible substrate to each receive focused light originating from a corresponding light source of the light sources 22. In this example, the flexible substrate may be held between two clamping pieces that have surfaces corresponding to the shape of the curved surface of the receive assembly 30. Thus, in this example, assembly of the receive assembly 30 can be simplified by sliding the flexible substrate onto the receive assembly 30 and using the two clamping pieces to hold it at the correct curvature.

The focused light 58 traversing along the receive path can be received by the detectors 32 via the entrance aperture 36. In some examples, the entrance aperture 36 can include a filtering window that passes light having wavelengths within the wavelength range emitted by the plurality of light sources 22 and attenuates light having other wavelengths. In this example, the detectors 32 receive the focused light 58 substantially comprising light having the wavelengths within the wavelength range.

In some examples, the plurality of detectors 32 included in the receive assembly 30 can include, for example, avalanche photodiodes in a sealed environment that is filled with the inert gas 34. The inert gas 34 may comprise, for example, nitrogen.

The shared space 40 includes the transmit path for the emitted light beams 52 from the transmit assembly 20 to the lens 50, and includes the receive path for the focused light 58 from the lens 50 to the receive assembly 30. In some examples, the transmit path at least partially overlaps with the receive path in the shared space 40. By including the transmit path and the receive path in the shared space 40, advantages with respect to size, cost, and/or complexity of assembly, manufacture, and/or maintenance of the sensing system 10 can be provided.

While the exit aperture 26 and the entrance aperture 36 are illustrated as being part of the transmit assembly 20 and the receive assembly 30, respectively, it is understood that such apertures may be arranged or placed at other locations. In some embodiments, the function and structure of the exit aperture 26 and the entrance aperture 36 may be combined. For example, the shared space 40 may include a shared entrance/exit aperture. It will be understood that other ways to arrange the optical components of sensing system 10 within housing 12 are possible and contemplated.

In some examples, the shared space 40 can include a reflective surface 42. The reflective surface 42 can be arranged along the receive path and configured to reflect the focused light 58 towards the entrance aperture 36 and onto the detectors 32. The reflective surface 42 may comprise a prism, mirror or any other optical element configured to reflect the focused light 58 towards the entrance aperture 36 in the receive assembly 30. In some examples, a wall may separate the shared space 40 from the transmit assembly 20. In these examples, the wall may comprise a transparent substrate (e.g., glass) and the reflective surface 42 may comprise a reflective coating on the wall with an uncoated portion for the exit aperture 26.

In embodiments including the reflective surface 42, the reflective surface 42 can reduce size of the shared space 40 by folding the receive path similarly to the mirror 24 in the transmit assembly 20. Additionally or alternatively, in some examples, the reflective surface 42 can direct the focused light 58 to the receive assembly 30 further providing flexibility to the placement of the receive assembly 30 in the housing 12. For example, varying the tilt of the reflective surface 42 can cause the focused light 58 to be reflected to various portions of the interior space of the housing 12, and thus the receive assembly 30 can be placed in a corresponding position in the housing 12. Additionally or alternatively, in this example, the sensing system 10 can be calibrated by varying the tilt of the reflective surface 42.

The lens 50 mounted to the housing 12 can have an optical power to both collimate the emitted light beams 52 from the light sources 22 in the transmit assembly 20, and focus the reflected light 56 from the one or more objects in the environment of the sensing system 10 onto the detectors 32 in the receive assembly 30. In one example, the lens 50 has a focal length of approximately 120 mm. By using the lens 50 to perform both of these functions, instead of a transmit lens for collimating and a receive lens for focusing, advantages with respect to size, cost, and/or complexity can be provided. In some examples, collimating the emitted light beams 52 to provide the collimated light beams 54 allows determining the distance traveled by the collimated light beams 54 to the one or more objects in the environment of the sensing system 10.

While, as described herein, lens 50 is utilized as a transmit lens and a receive lens, it will be understood that separate lens and/or other optical elements are contemplated within the scope of the present disclosure. For example, lens 50 could represent distinct lenses or lens sets along discrete optical transmit and receive paths.

In an example scenario, the emitted light beams 52 from the light sources 22 traversing along the transmit path can be collimated by the lens 50 to provide the collimated light beams 54 to the environment of the sensing system 10. The collimated light beams 54 may then reflect off the one or more objects in the environment of the sensing system 10 and return to the lens 50 as the reflected light 56. The lens 50 may then collect and focus the reflected light 56 as the focused light 58 onto the detectors 32 included in the receive assembly 30. In some examples, aspects of the one or more objects in the environment of the sensing system 10 can be determined by comparing the emitted light beams 52 with the focused light 58. The aspects can include, for example, distance, shape, color, and/or material of the one or more objects. Additionally, in some examples, by rotating the housing 12, a three-dimensional map of the surroundings of the sensing system 10 can be determined.

In some examples where the plurality of light sources 22 are arranged along a curved surface of the transmit assembly 20, the lens 50 can be configured to have a focal surface corresponding to the curved surface of the transmit assembly 20. For example, the lens 50 can include an aspheric surface outside the housing 12 and a toroidal surface inside the housing 12 facing the shared space 40. In this example, the shape of the lens 50 allows the lens 50 to both collimate the emitted light beams 52 and focus the reflected light 56. Additionally, in this example, the shape of the lens 50 allows the lens 50 to have the focal surface corresponding to the curved surface of the transmit assembly 20. In some examples, the focal surface provided by the lens 50 substantially matches the curved shape of the transmit assembly 20. Additionally, in some examples, the detectors 32 can be arranged similarly in the curved shape of the receive assembly 30 to receive the focused light 58 along the curved focal surface provided by the lens 50. Thus, in some examples, the curved surface of the receive assembly 30 may also substantially match the curved focal surface provided by the lens 50.

Figure 1B:
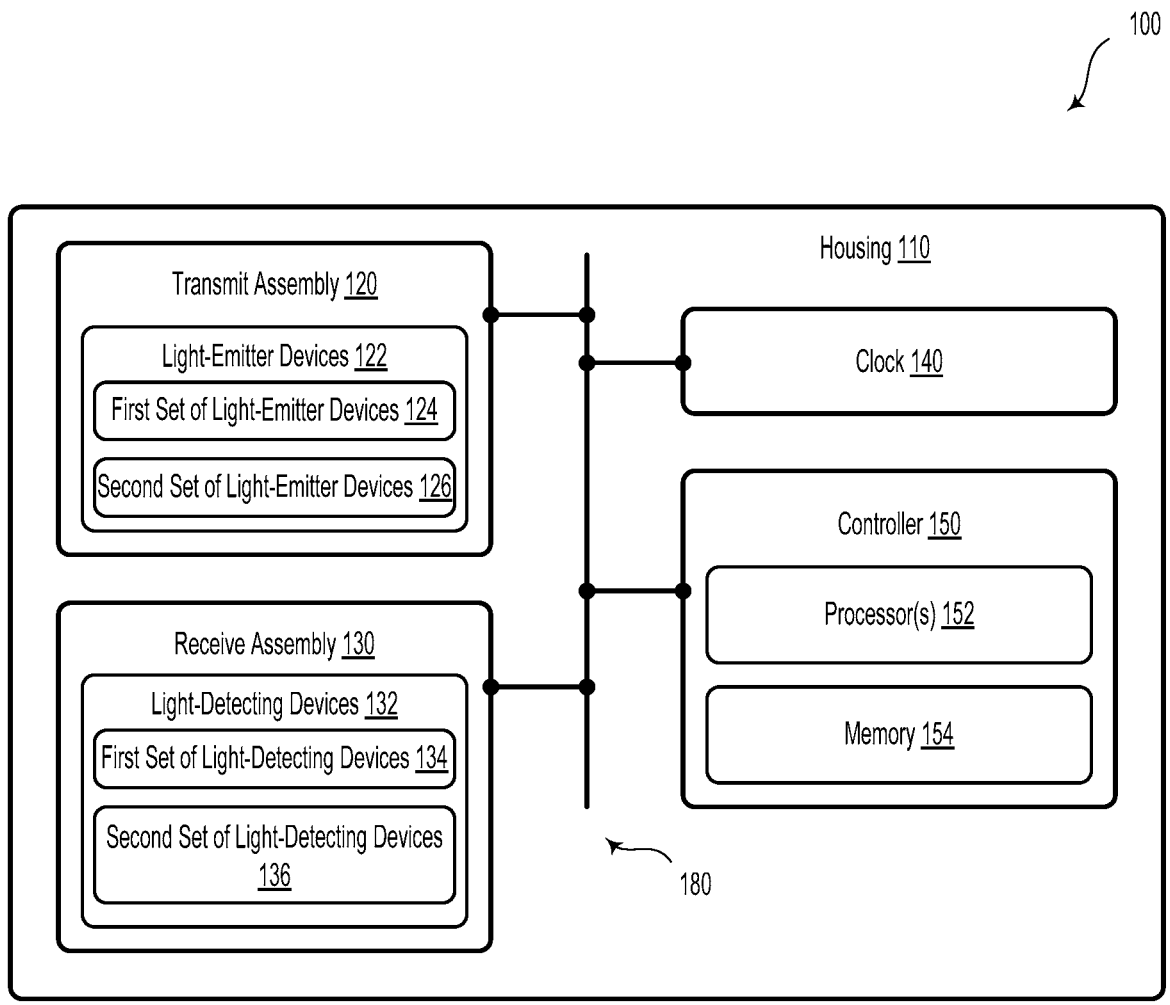
FIG. 1B illustrates a system, according to an example embodiment.

FIG. 1B illustrates a system 100, according to an example embodiment. System 100 may include elements that may be similar or identical to that of sensing system 10. For example, system 100 includes a housing 110, a transmit assembly 120, and a receive assembly 130, which may be similar or identical to housing 12, transmit assembly 20, and receive assembly 30, respectively.

In some embodiments, the housing 110 may be configured to rotate about a rotational axis. For example, the rotational axis may include a substantially vertical axis. In such scenarios, the housing 110 may be operable to rotate about the vertical axis at a steady or variable rate of rotation. Accordingly, if the housing 110 is mounted at an elevated position on a vehicle, the housing 110 may rotate such that point cloud information may be obtained from 360 degrees around the vehicle. Other ways to adjust a position or orientation of the housing 110 are possible and contemplated.

In an example embodiment, the transmit assembly 120 includes a plurality of light-emitter devices 122. In some embodiments, the plurality of light-emitter devices 122 may include at least 256 light-emitter devices. For example, the plurality of light-emitter devices 122 may include a first set of light-emitter devices 124 and a second set of light-emitter devices 126.

The light-emitter devices 122 are operable to emit light pulses. In some embodiments, a portion of the emitted light pulses may interact with an environment of the system 100 to provide reflected light pulses. In some embodiments, the emitted light pulses and/or the reflected light pulses may include wavelengths in the near infrared range. However, other wavelengths of light are contemplated and possible within the context of the present disclosure.

In some embodiments, the receive assembly 130 includes a plurality of light-detecting devices 132. In some embodiments, plurality of light-detecting devices 132 may include a first set of light-detecting devices 134 and a second set of light-detecting devices 136. Each of the plurality of light-detecting devices 132 is operable to detect the reflected light pulses. The plurality of light-detecting devices may include at least 256 light-detecting devices.

In an example embodiment, the transmit assembly 120 and the receive assembly 130 are coupled to the housing 110. That is, in some embodiments, transmit assembly 120 and/or the receive assembly 130 may be housed, at least in part, within housing 110.

System 100 also includes a clock 140, which may provide a temporal reference signal. The temporal reference signal provided by clock 140 may be used either locally (e.g., used by one or more elements of the system 100) or system-wide (e.g., used by all elements of system 100) to help synchronize elements of the system 100 and/or to obtain time-of-flight measurements for emitted light pulses and corresponding received reflected light.

System 100 includes a controller 150 having a memory 154 and at least one processor 152. The at least one processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The controller 150 may include a computing device disposed on a vehicle, an external computer, or a mobile computing platform, such as a smartphone, tablet device, personal computer, wearable device, etc. Additionally or alternatively, the controller 150 may include, or be connected to, a remotely-located computer system, such as a cloud server. In an example embodiment, the controller 150 may be configured to carry out some or all method blocks or steps described herein.

As an example, the at least one processor 152 may execute instructions stored in the memory 154 so as to carry out certain operations. The operations may include some or all of the functions, blocks, or steps described herein. In some embodiments, different computing devices or controllers may carry out the various functions, blocks, or steps described herein, in various combinations.

The operations may include, for example, causing, during a first time period, the first set of light-emitter devices 124 of the plurality of light-emitter devices 122 to emit light pulses into the environment according to a first spatial light pattern. As an example, the first spatial light pattern could include a low-resolution scan, which may have a resolution of 400 millimeters between adjacent point cloud data locations at 25 meters from the LIDAR system.

The operations may also include causing first set of light-detecting devices 134 of the plurality of light-detecting devices 132 to obtain first reflected light data by detecting at least a portion of the light pulses emitted into the environment according to the first spatial light pattern.

Furthermore, the operations may also include causing, during a second time period, a second set of light-emitter devices 126 of the plurality of light-emitter devices 122 to emit light pulses into the environment according to a second spatial light pattern. In an example embodiment, the first spatial light pattern and the second spatial light pattern include different spatial resolutions. That is, the first spatial light pattern may include a coarse spatial resolution and the second spatial light pattern may include a fine spatial resolution. However, other types of spatial light patterns and/or spatio-temporal resolutions are possible and contemplated.

In such scenarios, the operations may further include causing a second set of light-detecting devices 136 of the plurality of light-detecting devices 132 to obtain second reflected light data by detecting at least a portion of the light pulses emitted into the environment according to the second spatial light pattern.

In some scenarios, the second set of light-emitter devices 124 may include more light-emitter devices of the plurality of light-emitter devices 122 than the first set of light-emitter devices 126. That is, causing the first set of light-emitter devices 124 to emit light pulses into the environment may be part of obtaining a rough or coarse scan. In such scenarios, causing the second set of light-emitter devices 126 to emit light pulses into the environment could be part of obtaining a fine scan.

The operations could include, for example, forming point cloud data based on the first reflected light data and the second reflected light data.

In some embodiments, the operations may include, during the first time period, operating the light-emitter devices 122 and light-detecting devices 132 at a first operating frequency. In such scenarios, the operations may also include, during the second time period, operating the light-emitter devices 122 and light-detecting devices 132 at a second operating frequency. In an example embodiment, the second operating frequency could be higher than the first operating frequency. For example, the second operating frequency could be in the tens of kHz (e.g., 30 kHz to 500 kHz), whereas the first operating frequency could be around 10 Hz. Other operating frequencies are possible and contemplated herein.

Additionally or alternatively, the operations may include interleaving at least one fine scan (a high resolution scan) among a plurality of coarse scans (e.g., low resolution scans). Additionally or alternatively, the operations may include alternating between fine and coarse scans, or alternating between scan resolutions "on-the-fly". In such scenarios, power, data rate, and/or point cloud computation capacity may be conserved compared to conducting a succession of fine scans.

In some embodiments, the operations may optionally include determining a region of interest in the environment. Regions of interest could include, but need not be limited to, other vehicles, cyclists, motorcyclists, pedestrians, roadways, obstacles, curbs, sidewalks, pedestrian crossings, signs, stoplights, turn signals, and/or intersections. It will be understood that other types of regions of interest may be determined so as to provide more information about an environment around a vehicle. Such regions of interest may provide information to help establish a pose of the vehicle, a speed and direction of travel of the vehicle, a path determination for the vehicle, or detect obstacles, threats, or other safety considerations during the operations of the vehicle.

In response to determining the region of interest, the operations include determining a desired spatial light pattern. The determined desired spatial light pattern could include a desired spatial resolution (e.g., 25-400 mm between adjacent point cloud positions at 25 meters) or a desired spatial arrangement of point cloud positions (e.g., square array, hexagonal array, a linear array, another type of regular array, or an irregular array).

In such scenarios, the operations may include causing at least a portion of the plurality of light-emitter devices 122 to emit light pulses into, or toward, the region of interest in the environment according to the desired spatial light pattern. For example, light pulses may be specifically concentrated (e.g., at a higher areal density) within the region of interest. In some embodiments, the region of interest could be illuminated by light pulses in the desired spatial light pattern based on the type of object in the region of interest. For example, a region of interest that includes a potential other vehicle could be associated with a desired spatial light pattern with a maximum spacing between adjacent light pulses of 50 millimeters. In another example, a region of interest that includes a potential pedestrian could be associated with a desired spatial light pattern with a maximum spacing of 25 millimeters between adjacent light pulses. In such scenarios, the characteristics of the desired spatial light pattern (e.g., maximum spacing between adjacent light pulses, spatial arrangement of light pulses, scan rate, etc.) could be based on a priority of one or more objects within a given region of interest. For instance, pedestrians could represent highest priority, followed by other moving objects on the roadway, moving objects on an adjacent sidewalk, and then stationary objects (e.g., the roadway, signs, buildings, etc.). Other priorities for objects within a given region of interest are contemplated and possible within the scope of the present disclosure. Based on the priority of one or more objects within a given region of interest, the desired spatial light pattern could be calculated or otherwise determined. In an example embodiment, desired spatial light patterns could be generated "on-the-fly" or provided based on templates that may be applied in similar scenarios.

System 100 may include a communication interface 180. The communication interface 180 may be configured to provide a communication link between various elements of system 100 such as the controller 150, the transmit assembly 120, the receive assembly 130, the clock 140, one or more computing networks, and/or other vehicles.

The communication interface 180 could be, for example, a system configured to provide wired or wireless communication between one or more other vehicles, sensors, or other elements described herein, either directly or via a communication network. To this end, the communication interface 180 may include an antenna and a chipset for communicating with the other vehicles, sensors, servers, or other entities either directly or via the communication network. The chipset or communication interface 180 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The communication interface 180 may take other forms as well.

Figure 2:
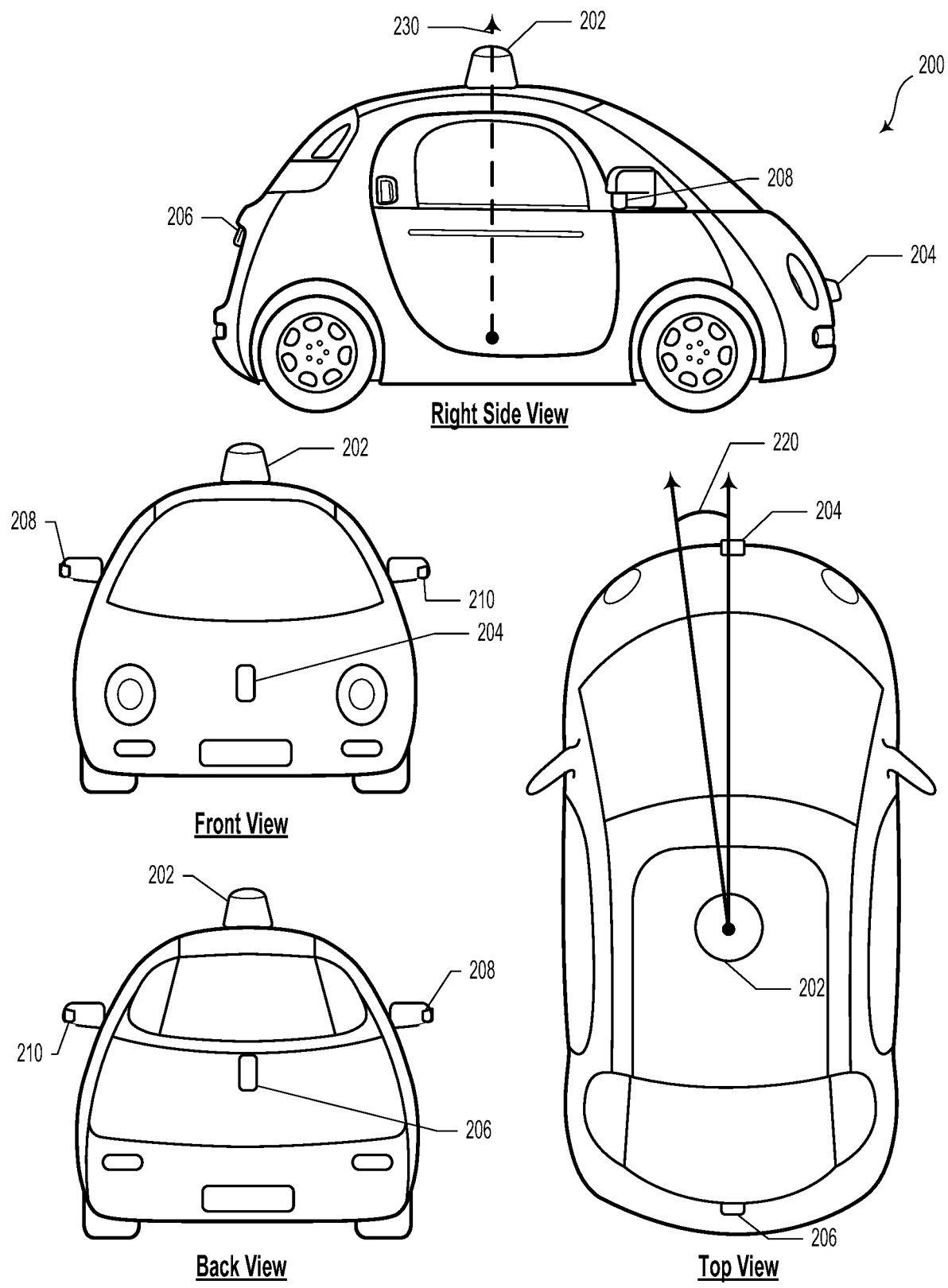
FIG. 2 illustrates a vehicle, according to an example embodiment.

FIG. 2 illustrates a vehicle 200, according to an example embodiment. While FIG. 2 illustrates an automobile (e.g., a car), it will be understood that other types of vehicles are possible and contemplated herein. The vehicle 200 may include one or more sensor systems 202, 204, 206, 208, and/or 210. The one or more sensor systems 202, 204, 206, 208, and 210 could be similar or identical to sensors described with regard to sensing system 10 and system 100, as illustrated and described in reference to FIGS. 1A and 1B. Namely, sensor systems 202, 204, 206, 208, and 210 could include one or more of: LIDAR sensors (e.g., sensing system 10 and system 100), cameras, and/or RADAR sensors. In some examples, sensor system 202 could include a LIDAR system, camera, and a RADAR sensor, however other variations, combinations, and arrangements of sensors are possible.

In an example embodiment, one or more of the sensor systems 202, 204, 206, 208, and 210 may be configured to rotate about an axis (e.g., the vertical axis 230) so as to illuminate an environment around the vehicle 200 with laser light pulses. For example, at least a portion of sensor system 202 could be configured to rotate about the vertical axis 230 by changing an angle of rotation 220. In an example embodiment, sensor systems 202, 204, 206, 208, and 210 may be configured to provide respective point cloud information that may relate to physical objects within the environment of the vehicle 200. In such scenarios, based on detecting various aspects of reflected light pulses (e.g., the elapsed time of flight, polarization, etc.), information about the environment may be determined and/or inferred. Additionally or alternatively, vehicle 200 could include a LIDAR system configured to controllably scan a relatively narrow desired field of view so as to determine point cloud information in a desired portion of the environment around the vehicle. Such a LIDAR system may be configured to provide better point cloud resolution at longer distances.

Sensor systems 202, 204, 206, 208, and 210 could be configured to move in a desired manner with respect to the vehicle 200 so as to obtain dynamic information about the environment of the vehicle 200. For example, a camera and/or a RADAR may rotate around an axis or could be controllably oriented toward a desired field of view so as to provide information about a desired portion of the environment of the vehicle 200.

While FIG. 2 illustrates sensor systems 202, 204, 206, 208, and 210 as being located at certain locations on the vehicle 200, it will be understood that many other arrangements of sensors are possible and contemplated. In some embodiments, information about the environment around the vehicle 200 may be incorporated using a sensor fusion algorithm (e.g., a Kalman filter and/or a Bayes network). Furthermore, while embodiments herein are directed to various configurations and operating modes with respect to LIDAR sensors, it will be understood that the various combinations of the different sensor types may be adjusted so as to provide information about the vehicle's environment with a desired spatio-temporal resolution.

For example, various embodiments herein describe a failsafe mode, which may be entered due to a malfunction, failure, or otherwise inoperable state of at least a portion of the LIDAR system. In response to entering the failsafe mode of operation, one or more other types of sensor (e.g., a camera and/or a RADAR) may be operable to increase their respective spatio-temporal resolutions so as to possibly compensate for the loss of the LIDAR information. Other types of compensatory or emergency actions are possible to maintain environmental awareness during and after a LIDAR sensor system failure.

Figure 3A:
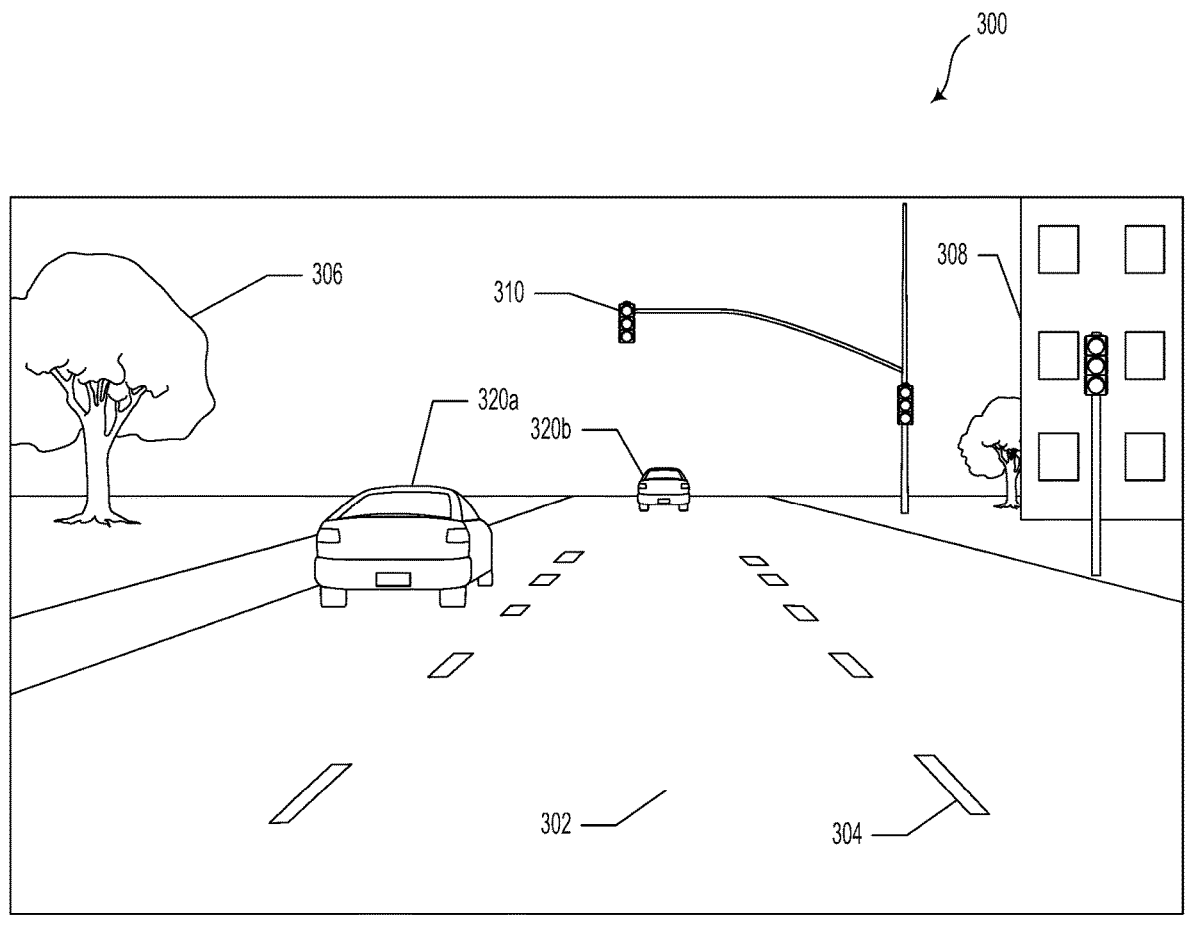
FIG. 3A illustrates a driving scenario, according to an example embodiment.

FIG. 3A illustrates a driving scenario 300, according to an example embodiment. The driving scenario 300 includes forward view of a vehicle (e.g., vehicle 200) as it is driving along a roadway 302. The roadway 302 could include lane markers 304 or curbs that separate various driving lanes and portions of the roadway 302. The driving scenario may include a traffic light 310. The driving scenario 300 could also include static objects like a tree 306 and a building 308. The driving scenario 300 may additionally include moving objects such as other vehicles 320a and 320b. The driving scenario 300 provides an example environment that could be scanned by a LIDAR system (e.g., aboard vehicle 200). It will be understood that many other driving/flying/underwater environments and operational scenarios are possible, which are explicitly contemplated herein.

Figure 3B:
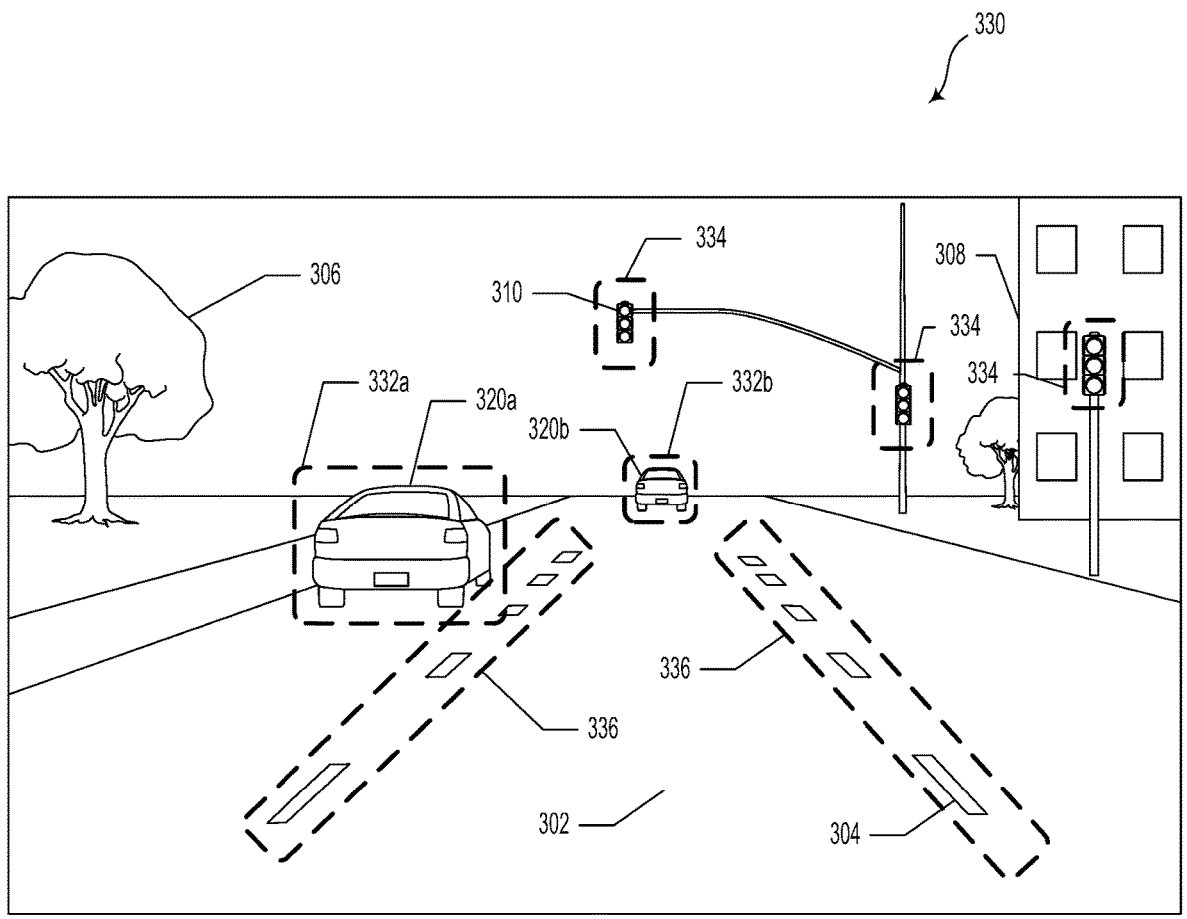
FIG. 3B illustrates a driving scenario, according to an example embodiment.

FIG. 3B illustrates a driving scenario 330, according to an example embodiment. Specifically, FIG. 3B illustrates how systems and methods described herein may operate in a real-world scenario. For instance, during an initial time period, a rough or coarse-resolution LIDAR scan may be performed over all or a portion of the LIDAR scan range. That is, a subset of light-emitter devices of the plurality of light-emitter devices may emit light pulses into the environment according to a rough spatial light pattern (e.g., 200 millimeters between adjacent point cloud locations at 25 meters from the vehicle).

In such a scenario, a corresponding first set of light-detecting devices of the plurality of light-detecting devices may obtain first reflected light data by detecting at least a portion of the light pulses emitted into the environment according to the rough spatial light pattern.

Thereafter, in an example embodiment, a second set of light-emitter devices of the plurality of light-emitter devices to emit light pulses into the environment according to a fine spatial light pattern. In such a scenario, the fine spatial light pattern may include a different, higher spatial and/or temporal resolution as compared to the rough spatial light pattern. For example, the fine spatial light pattern could include a point cloud spacing of 25 mm between adjacent positions at 25 meters from the vehicle. A corresponding temporal resolution for obtaining the fine spatial light pattern could be, for example, 20 Hz, as compared to 10 Hz for the rough spatial light pattern.

In response to emitting the second set of light pulses into the environment, a corresponding second set of light-detecting devices of the plurality of light-detecting devices may obtain second reflected light data by detecting at least a portion of the light pulses emitted into the environment according to the fine spatial light pattern. Thereafter, point cloud data may be formed based on the first reflected light data and the second reflected light data.

The fine spatial light pattern could include various regions of interest and/or objects within those regions of interest. For example, the regions of interest could include, but need not be limited to, a lane line region of interest 336, an other-vehicle region of interest 332a and 332b, and/or a sign/signal region of interest 334. It will be understood that other regions of interest (and corresponding objects within those regions) are possible and contemplated herein.

Accordingly, systems and methods herein could include scanning such regions of interest with a higher spatio-temporal resolution than other regions in the field of view of the LIDAR sensor.

Figure 4:
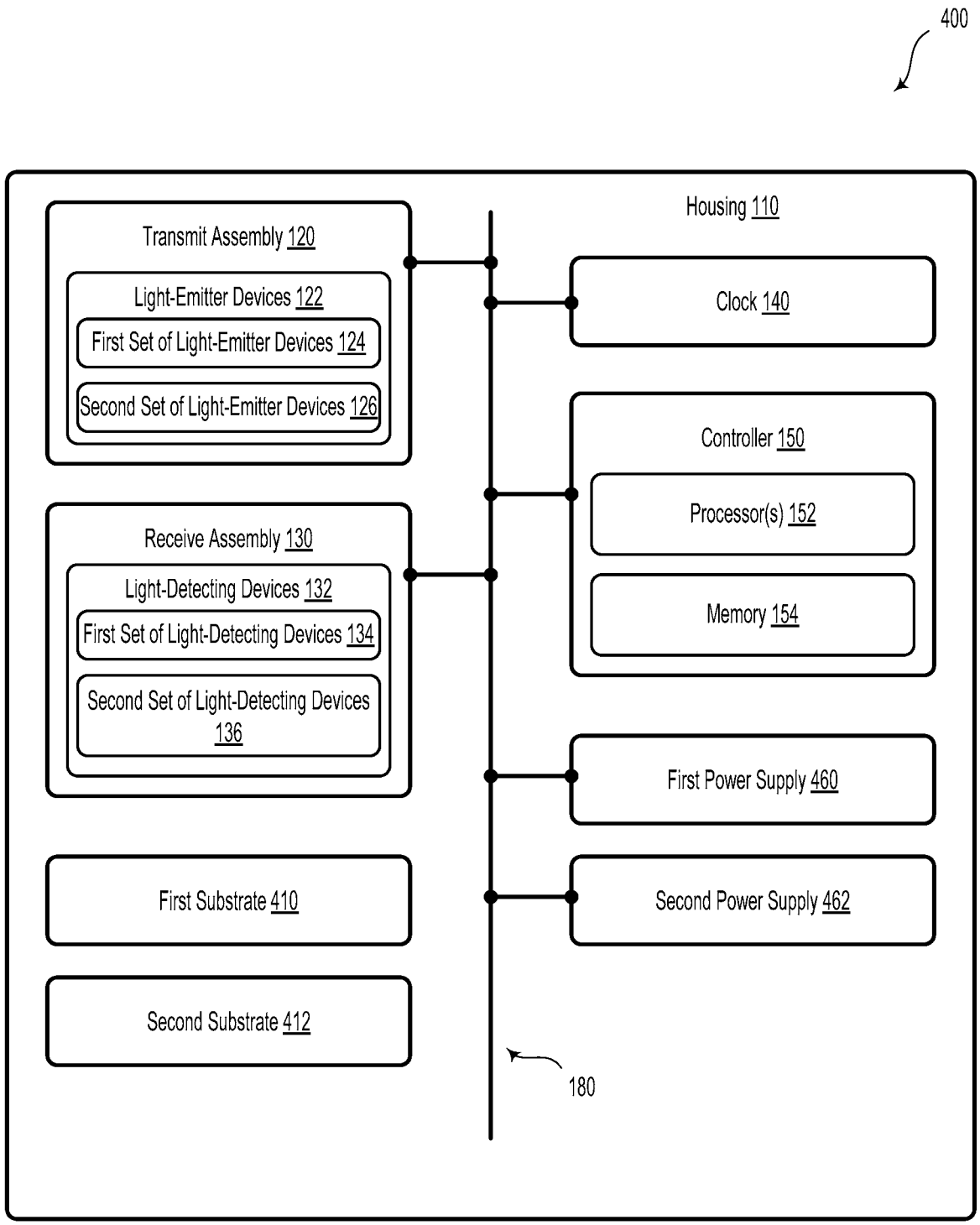
FIG. 4 illustrates a system, according to an example embodiment.

FIG. 4 illustrates a system 400, according to an example embodiment. System 400 may include similar or identical elements as compared to sensing system 10, system 100, and/or vehicle 200, as illustrated and described in reference to FIGS. 1A, 1B, and 2. For example, system 400 may include a transmit assembly 120, a receive assembly 130, a clock 140, and a controller 150. In some embodiments, system 400 may provide a redundant, failsafe LIDAR sensor system.

System 400 may also include a plurality of power supplies. For example, system 400 may include a first power supply 460 and a second power supply 462. In an example embodiment, the first power supply 460 may be configured to provide electrical power to at least the first set of light-emitter devices 124 and the first set of light-detecting devices 134. Furthermore, the second power supply 462 may be configured to provide electrical power to at least the second set of light-emitter devices 126 and the second set of light-detecting devices 136.

In some embodiments, the controller 150 may be segmented or otherwise separated so that separate processors and memory may be powered by the respective power supplies. For example, the separate processors and memory may be configured to carry out operations for the respective light-emitter devices (e.g., 124 and 126) and light-detecting devices (e.g., 134 and 136).

System 400 may also include a plurality of substrates, such as first substrate 410 and second substrate 412. In some embodiments, the first set of light-emitter devices 124 and the first set of light-detecting devices 134 may be coupled to the first substrate 410. For example, the first set of light-emitter devices 124 and the first set of light-detecting devices 134 could be located along and/or on the first substrate 410. In such scenarios, the second set of light-emitter devices 126 and the second set of light-detecting devices 136 may be coupled to the second substrate 412. For example, the second set of light-emitter devices 126 and the second set of light-detecting devices 136 could be located along and/or on the second substrate 412. Furthermore, while FIG. 4 illustrates a housing 110, in some embodiments, the first substrate 410 and the elements coupled to it may be housed in a first housing. Similarly, the second substrate 412 and its corresponding elements could be housed in a second housing.

In an example embodiment, the controller 150 of system 400 may be configured to execute program instructions so as to carry out operations similar to those described in relation to system 100, illustrated and described in reference to FIG. 1A. Additionally or alternatively, the operations may include operating the system according to a first mode of operation. In some embodiments, the first mode of operation may represent a "normal" mode of operation. In such a scenario, the first mode of operation may include causing the first set of light-emitter devices 124 and the second set of light-emitter devices 126 to emit light pulses into the environment and causing the first set of light-detecting devices 134 and the second set of light-detecting devices 136 to obtain respective first and second reflected light data, by detecting at least a portion of the light pulses emitted into the environment. The first mode of operation may also include forming point cloud data based on the first reflected light data and the second reflected light data.

In an example embodiment, the operations may also include determining a fault condition. The fault condition may be determined based on receiving (e.g., at the controller 150) information indicative of a malfunction of at least one of: the first set of light-emitter devices 124, the second set of light-emitter devices 126, the first set of light-detecting devices 134, the second set of light-detecting devices 136, the first power supply 460, or the second power supply 462. That is, in the event of an apparent malfunction of a sensor subsystem, the controller 150 may determine the fault condition.

In such a scenario, in response to determining the fault condition, the system 400 may be operated in a second mode of operation, using the subsystems that are still operable after the malfunction. For instance, the second mode of operation could include causing either the first set of light-emitter devices 124 or the second set of light-emitter devices 126 (e.g., depending on which subsystem experienced the malfunction) to emit light pulses into the environment. The second mode of operation may also include causing a corresponding set of light-detecting devices (e.g., light-detecting devices 134 or 136) to obtain coarse reflected light data, by detecting at least a portion of the light pulses emitted into the environment and forming coarse point cloud data based on the coarse reflected light data. The coarse point cloud data may include reduced resolution data about the environment. That is, the coarse point cloud data may provide less spatio-temporal resolution about the vehicle's surrounding as compared to point cloud data obtained during "normal" operation (e.g., the first mode of operation).

In an example embodiment, system 400 may be operable to provide point cloud data to an autonomous or semi-autonomous vehicle. In such a scenario, the operations may further include in response to determining the fault condition, at least one of: causing the vehicle to move to a maintenance location, causing the vehicle to move out of a traffic lane, causing the vehicle to reduce speed, or causing the vehicle to increase a following distance. In other words, upon determining the fault condition, the vehicle may be controlled to perform actions that may reduce or eliminate the danger of operating the vehicle with an inoperative or malfunctioning LIDAR sensor system. Such actions may include slowing down, pulling over, navigating to a repair location, and/or compensating with adjusting the operation of other types of sensors. For example, in the event of a partial or full LIDAR sensor malfunction, a camera image frame rate could be increased, and/or a RADAR signal power could be increased. In so doing, a sensor fusion algorithm could provide redundancy and safer operation.

Furthermore, in response to determining the fault condition, the operations may include causing one of the first set of light-emitter devices or the second set of light-emitter devices to provide light pulses at an increased pulse frequency (e.g., as compared to the first mode of operation). That is, the light-emitter devices may provide light pulses at a first pulse frequency (e.g., 30 kHz) during the first mode of operation. In such a scenario, the increased pulse frequency could be at least two times the first pulse frequency (e.g., greater than 60 kHz). Other pulse frequencies are possible.

III. Example Methods

Figure 5:
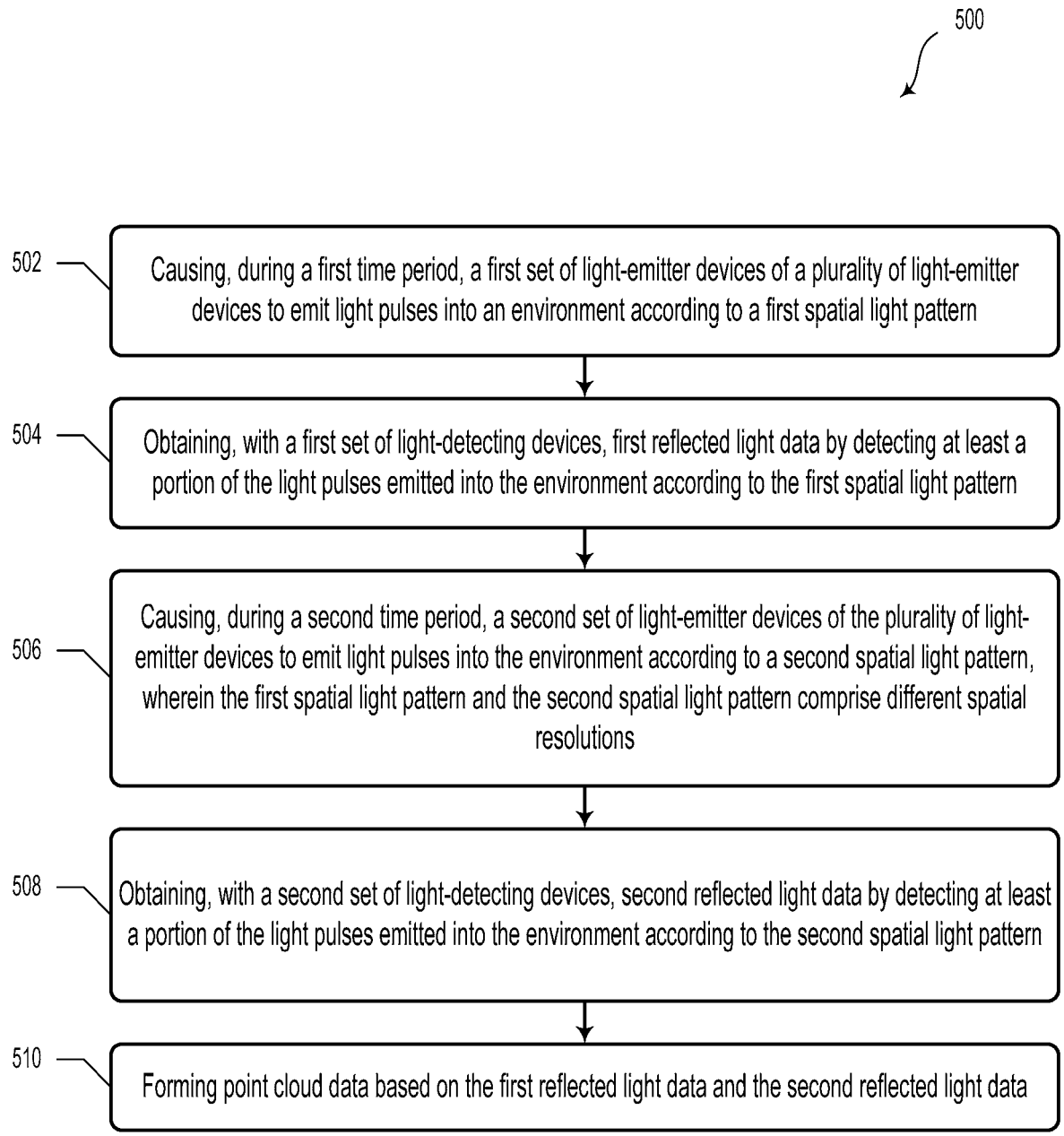
FIG. 5 illustrates a method, according to an example embodiment.

FIG. 5 illustrates a method 500, according to an example embodiment. Method 500 may be carried out, in full or in part, by sensing system 10, system 100, vehicle 200, system 400, or controller 150 as illustrated and described in reference to FIGS. 1A, 1B, 2, and 4. Method 500 may include elements that are similar or identical to those illustrated and described with reference to FIGS. 1A, 1B, 2, and 4. It will be understood that the method 500 may include fewer or more steps or blocks than those expressly disclosed herein. Furthermore, respective steps or blocks of method 500 may be performed in any order and each step or block may be performed one or more times.

Block 502 includes causing, during a first time period, a first set of light-emitter devices of a plurality of light-emitter devices to emit light pulses into an environment according to a first spatial light pattern. In some embodiments, the plurality of light-emitter devices may include at least 256 light-emitter devices. However, more or fewer light-emitter devices are contemplated.

Block 504 include causing a first set of light-detecting devices to obtain first reflected light data by detecting at least a portion of the light pulses emitted into the environment according to the first spatial light pattern. In an example embodiment, the plurality of light-detecting devices includes at least 256 light-detecting devices. However, more or fewer light-detecting devices are contemplated.

Block 506 includes causing, during a second time period, a second set of light-emitter devices of the plurality of light-emitter devices to emit light pulses into the environment according to a second spatial light pattern. In an embodiment, during the first time period, the light-emitter devices and light-detecting devices may be operated at a first operating frequency. During the second time period, the light-emitter devices and light-detecting devices may be operated at a second operating frequency. In such scenarios, the first operating frequency may be lower than the second operating frequency.

Additionally or alternatively, the first spatial light pattern and the second spatial light pattern may include different spatial resolutions. In an example embodiment, the first set of light-emitter devices has fewer light-emitter devices of the plurality of light-emitter devices than the second set of light-emitter devices. As such, causing the first set of light-emitter devices to emit light pulses into the environment includes obtaining a coarse scan. Furthermore, causing the second set of light-emitter devices to emit light pulses into the environment may include a fine scan.

In some embodiments, method 500 may include at least one of: interleaving at least one fine scan among a plurality of coarse scans or alternating between fine and coarse scans.

Additionally or alternatively, the determination of whether to conduct a fine or coarse scan may be made dynamically (e.g., "on-the-fly"), based on, for instance, prior indicia of particular objects within a region of interest. That is, the controller 150 may determine a region of interest in the environment based on a driving scenario (e.g., vehicle speed, other vehicles, approaching intersection, type of roadway, weather condition, etc.) and/or particular objects in the environment (e.g., pedestrians, cyclists, obstacles, signage, detours, etc.).

In response to determining the region of interest, the method 500 may include determining a desired spatial light pattern. As described elsewhere herein, the spatial light pattern may include, for example, a spatial frequency or spatial resolution.

In such scenarios, method 500 may include causing at least a portion of the plurality of light-emitter devices to emit light pulses into the region of interest in the environment according to the determined spatial light pattern.

Block 508 includes causing a second set of light-detecting devices to obtain second reflected light data by detecting at least a portion of the light pulses emitted into the environment according to the second spatial light pattern.

Block 510 includes forming point cloud data based on the first reflected light data and the second reflected light data.

Figure 6:
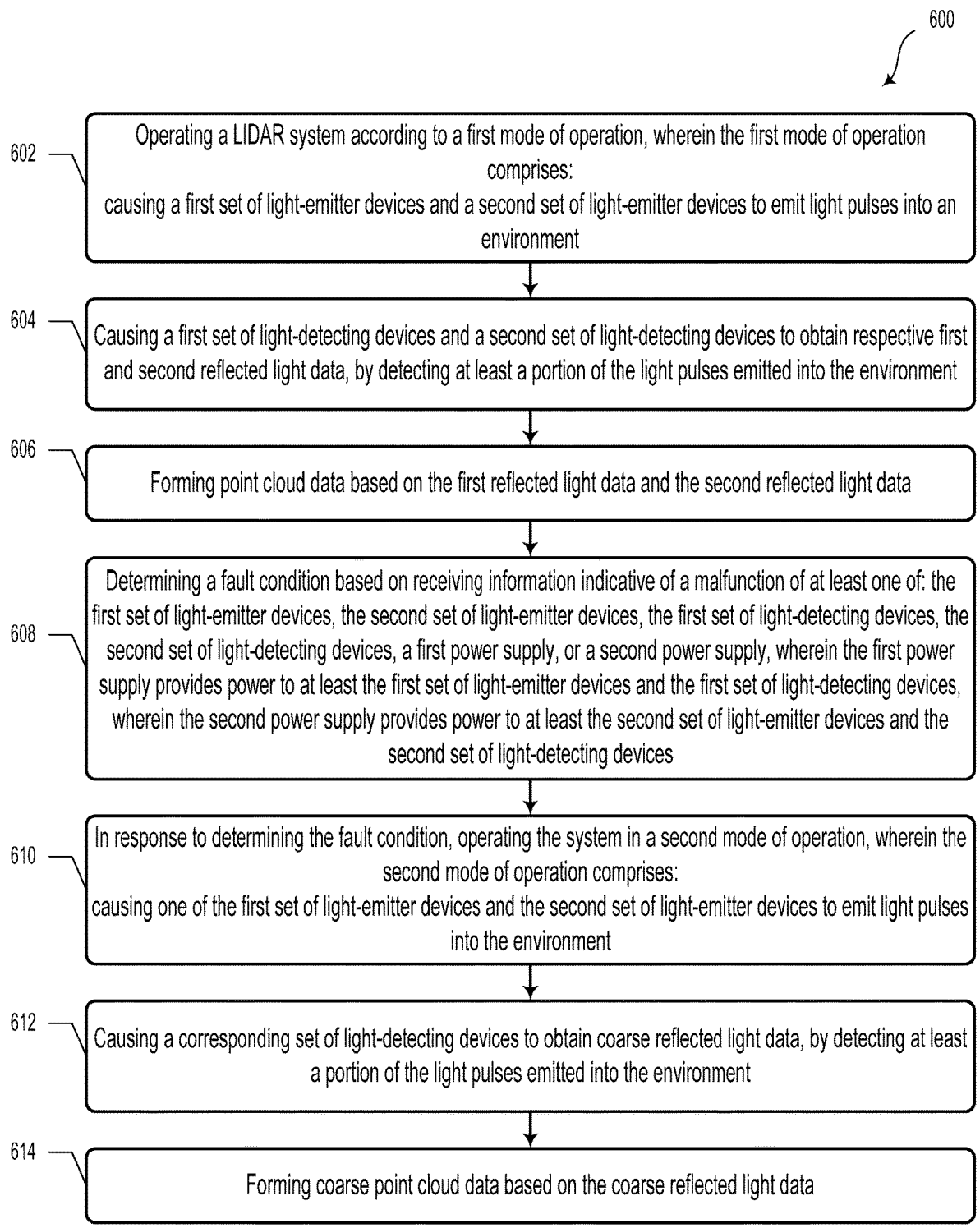
FIG. 6 illustrates a method, according to an example embodiment.

FIG. 6 illustrates a method 600, according to an example embodiment. Method 600 may be carried out, in full or in part, by sensing system 10, system 100, vehicle 200, system 400, or controller 150 as illustrated and described in reference to FIGS. 1A, 1B, 2, and 4. Method 600 may include elements that are similar or identical to those illustrated and described with reference to FIGS. 1A, 1B, 2, and 4. It will be understood that the method 600 may include fewer or more steps or blocks than those expressly disclosed herein. Furthermore, respective steps or blocks of method 500 may be performed in any order and each step or block may be performed one or more times.

Block 602 includes operating a LIDAR system according to a first mode of operation. As described herein, the first mode of operation includes causing a first set of light-emitter devices and a second set of light-emitter devices to emit light pulses into an environment.

Block 604 includes causing a first set of light-detecting devices and a second set of light-detecting devices to obtain respective first and second reflected light data, by detecting at least a portion of the light pulses emitted into the environment. In an example embodiment, the first set of light-emitter devices and the first set of light-detecting devices could be arranged along a first substrate. The second set of light emitter devices and the second set of light-detecting devices could be arranged along a second substrate.

Block 606 includes forming point cloud data based on the first reflected light data and the second reflected light data.

Block 608 includes determining a fault condition based on receiving information indicative of a malfunction of at least one of: the first set of light-emitter devices, the second set of light-emitter devices, the first set of light-detecting devices, the second set of light-detecting devices, a first power supply, or a second power supply. In such a scenario, the first power supply may provide power to at least the first set of light-emitter devices and the first set of light-detecting devices. Furthermore, the second power supply may provide power to at least the second set of light-emitter devices and the second set of light-detecting devices.

Block 610 includes, in response to determining the fault condition, operating the system in a second mode of operation. The second mode of operation includes causing either the first set of light-emitter devices or the second set of light-emitter devices to emit light pulses into the environment. In an example embodiment, causing the first or the second set of light-emitter devices to emit light pulses may include selecting either the first or the second set of light-emitter devices based on where the fault condition occurred and/or which subsystems were affected. That is, if the fault occurred in the first set of light-emitter devices, the method 600 may include selecting the second set of light-emitter devices, or vice versa. Generally, if the fault occurred to a first set of a given subsystem (e.g., emitters, detectors, or power supply), the method 600 may include selecting or otherwise utilizing the corresponding second set of the given subsystem, or vice versa.

As an example, in the scenario where point cloud data from the LIDAR device may be provided to an autonomous or semi-autonomous vehicle, in response to determining the fault condition, the operations may include causing the vehicle to perform one or more actions. The actions may include, for instance, moving to a maintenance location, moving out of a traffic lane, reducing speed, or increasing a following distance. Other actions are possible and contemplated within the scope of this disclosure.

In some embodiments, in response to determining the fault condition, the operations may include causing either the first set of light-emitter devices or the second set of light-emitter devices to provide light pulses at an increased pulse frequency. In such a scenario, the light-emitter devices provide light pulses at a first pulse frequency during the first mode of operation. The increased pulse frequency may be, for example, at least two times the first pulse frequency.

Block 612 includes causing a corresponding set of light-detecting devices to obtain coarse reflected light data, by detecting at least a portion of the light pulses emitted into the environment. In an example, the coarse point cloud data may include reduced resolution data about the environment as compared to the point cloud data obtained in the first mode of operation.

Block 614 includes forming coarse point cloud data based on the coarse reflected light data.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a housing configured to rotate about a rotational axis;
    a transmit assembly, wherein the transmit assembly comprises:
        a first set of light-emitter devices and a second set of light-emitter devices, wherein the light-emitter devices are operable to emit light pulses, wherein a portion of the light pulses interact with an environment of the system to provide reflected light pulses;
    a receive assembly wherein the receive assembly comprises:
        a first set of light-detecting devices and a second set of light-detecting devices, wherein the light-detecting devices are operable to detect the reflected light pulses, wherein the transmit assembly and the receive assembly are coupled to the housing;
    a first power supply configured to provide power to at least the first set of light-emitter devices and the first set of light-detecting devices;
    a second power supply configured to provide power to at least the second set of light-emitter devices and the second set of light-detecting devices; and
    a controller comprising at least one processor and a memory, wherein the at least one processor executes program instructions stored in the memory so as to carry out operations, the operations comprising:
        operating the system according to a first mode of operation, wherein the first mode of operation comprises:
            causing the first set of light-emitter devices and the second set of light-emitter devices to emit light pulses into the environment;
            causing the first set of light-detecting devices and the second set of light-detecting devices to obtain respective first and second reflected light data, by detecting at least a portion of the light pulses emitted into the environment;
            forming point cloud data based on the first reflected light data and the second reflected light data; and
            determining a fault condition based on receiving information indicative of a malfunction of at least one of: the first set of light-emitter devices, the second set of light-emitter devices, the first set of light-detecting devices, the second set of light-detecting devices, the first power supply, or the second power supply; and
        in response to determining the fault condition, operating the system in a second mode of operation, wherein the second mode of operation comprises:

causing either the first set of light-emitter devices or the second set of light-emitter devices to emit light pulses into the environment;

causing a corresponding set of light-detecting devices to obtain coarse reflected light data, by detecting at least a portion of the light pulses emitted into the environment; and forming coarse point cloud data based on the coarse reflected light data.

2. The system of claim 1, wherein the system provides point cloud data to an autonomous or semi-autonomous vehicle, wherein the second mode of operation comprises at least one of:

causing the vehicle to move to a maintenance location;
causing the vehicle to move out of a traffic lane;
causing the vehicle to reduce speed; or
causing the vehicle to increase a following distance.

3. The system of claim 1, wherein the coarse point cloud data comprises reduced resolution data about the environment.

4. The system of claim 1, wherein the operations further comprise:

in response to determining the fault condition, causing either the first set of light-emitter devices or the second set of light-emitter devices to provide light pulses at an increased pulse frequency, wherein the light-emitter devices provide light pulses at a first pulse frequency during the first mode of operation, wherein the increased pulse frequency is at least two times the first pulse frequency.

5. The system of claim 1, wherein the first set of light-emitter devices and the first set of light-detecting devices are arranged along a first substrate, wherein the second set of light-emitter devices and the second set of light-detecting devices are arranged along a second substrate.

6. A method comprising:

operating a LIDAR system according to a first mode of operation, wherein the first mode of operation comprises:

causing a first set of light-emitter devices and a second set of light-emitter devices to emit light pulses into an environment;

causing a first set of light-detecting devices and a second set of light-detecting devices to obtain respective first and second reflected light data, by detecting at least a portion of the light pulses emitted into the environment;

forming point cloud data based on the first reflected light data and the second reflected light data; and determining a fault condition based on receiving information indicative of a malfunction of at least one of: the first set of light-emitter devices, the second set of light-emitter devices, the first set of light-detecting devices, the second set of light-detecting devices, a first power supply, or a second power supply, wherein the first power supply provides power to at least the first set of light-emitter devices and the first set of light-detecting devices, wherein the second power supply provides power to at least the second set of light-emitter devices and the second set of light-detecting devices; and in response to determining the fault condition, operating the LIDAR system in a second mode of operation, wherein the second mode of operation comprises:

causing either the first set of light-emitter devices or the second set of light-emitter devices to emit light pulses into the environment;

causing a corresponding set of light-detecting devices to obtain coarse reflected light data, by detecting at least a portion of the light pulses emitted into the environment; and forming coarse point cloud data based on the coarse reflected light data.

7. The method of claim 6, further comprising:

providing the point cloud data to an autonomous or semi-autonomous vehicle; and in response to determining the fault condition, causing the vehicle to perform at least one of:

moving to a maintenance location;
moving out of a traffic lane;
reducing speed; or
increasing a following distance.

8. The method of claim 6, wherein the coarse point cloud data comprises reduced resolution data about the environment.

9. The method of claim 6, further comprising:

in response to determining the fault condition, causing either the first set of light-emitter devices or the second set of light-emitter devices to provide light pulses at an increased pulse frequency, wherein the light-emitter devices provide light pulses at a first pulse frequency during the first mode of operation, wherein the increased pulse frequency is at least two times the first pulse frequency.

10. The method of claim 6, wherein the first set of light-emitter devices and the first set of light-detecting devices are arranged along a first substrate, wherein the second set of light-emitter devices and the second set of light-detecting devices are arranged along a second substrate.

* * * * *